(12) United States Patent
Krenzler

(10) Patent No.: US 7,063,483 B1
(45) Date of Patent: Jun. 20, 2006

(54) SUBMERGIBLE TIRE STRUCTURE

(75) Inventor: Leo M. Krenzler, 75-6060 Kuakini, Unit D-4, Kailua, Kona, HI (US) 96740

(73) Assignee: Leo M. Krenzler, Kona, HI (US)

( * ) Notice: Subject to any disclaimer, the term of this patent is extended or adjusted under 35 U.S.C. 154(b) by 0 days.

(21) Appl. No.: 11/251,494

(22) Filed: Oct. 17, 2005

(51) Int. Cl.
*E02B 3/04* (2006.01)
*A01K 61/00* (2006.01)

(52) U.S. Cl. ............... 405/25; 405/21; 405/15; 119/222

(58) Field of Classification Search ............ 405/15, 405/16, 21, 22, 24, 25, 30, 34, 35; 119/221, 119/222
See application file for complete search history.

(56) References Cited

U.S. PATENT DOCUMENTS

| 4,196,694 A | * | 4/1980 | Buchanan | 119/222 |
| 4,334,499 A | * | 6/1982 | Baass | 119/222 |
| 5,807,023 A | * | 9/1998 | Krenzler | 405/21 |
| 6,579,039 B1 | * | 6/2003 | Krenzler | 405/25 |

* cited by examiner

*Primary Examiner*—Frederick L. Lagman
(74) *Attorney, Agent, or Firm*—Delbert J. Barnard

(57) ABSTRACT

Lower sidewall portions (18, 20) of a vehicle tire (10) are spread apart by a spreader tool (28). Spreader bars (32, 34) are placed between the spread apart lower sidewall portions (18, 20) of the tire (10). Concrete (116) is poured in place in the tire. One or more iron members (120, 122, 124, 126) are placed in the tire (10) with lower portions in the concrete (116) and upper portions extending towards the inner side of the tread wall (26). At least one other iron member (120, 122, 124, 126) is positioned in the tire (10) with a lower end portion in the concrete (126) and an upper portion sloping upwardly and outwardly towards the inner side of the tread wall (26) on a diametrically opposite portion of the tire (10).

9 Claims, 7 Drawing Sheets

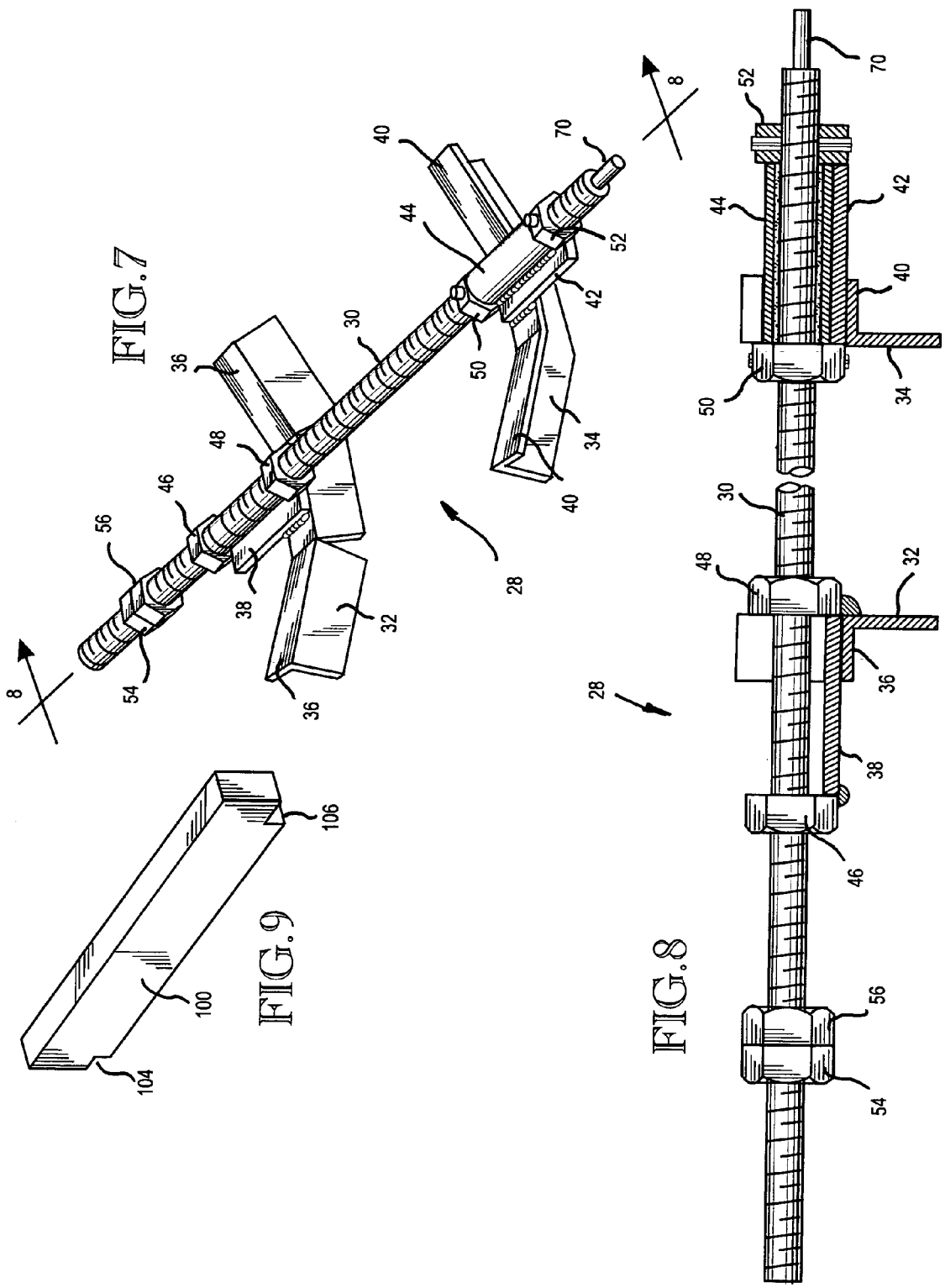

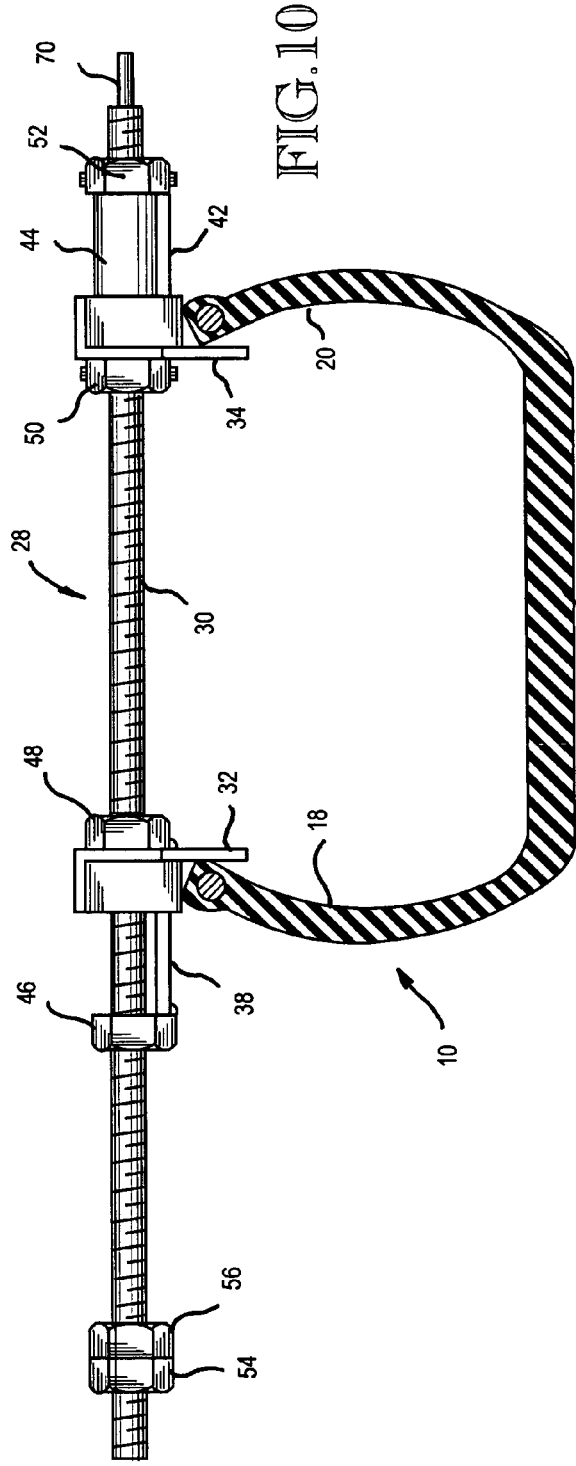
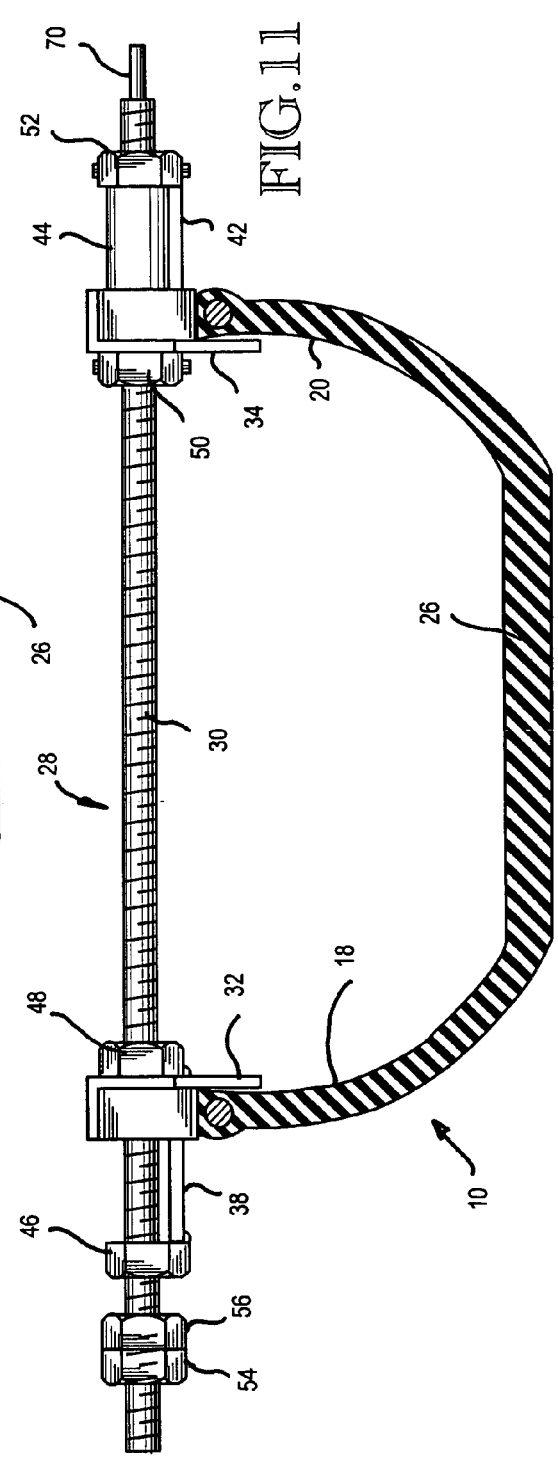

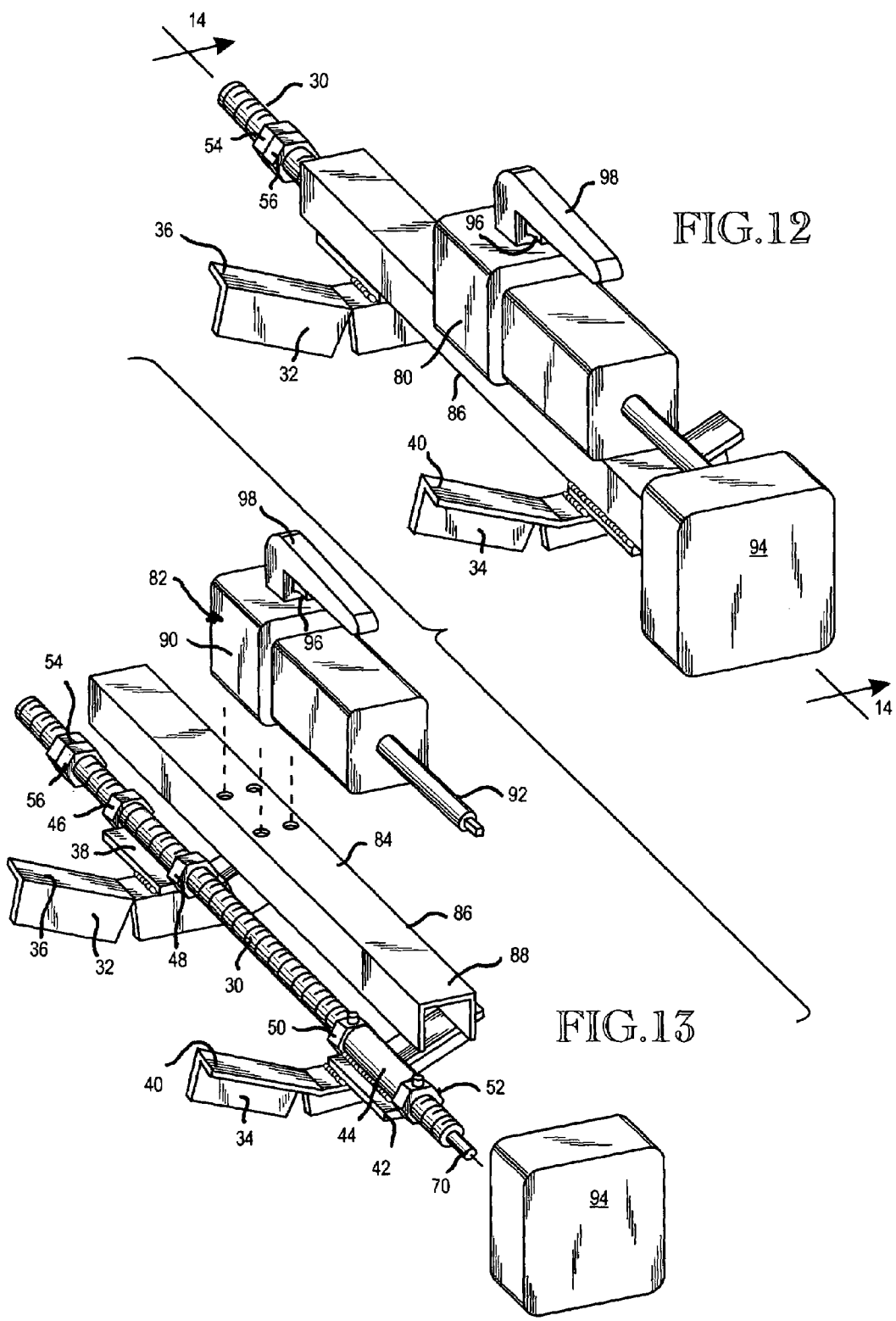

SUBMERGIBLE TIRE STRUCTURE

TECHNICAL FIELD

The present invention relates to a submersible tire structure that stands substantially upright in the water and includes a weight in its lower portion. More particularly, it relates to a concrete weight formed insitu that includes corrodible iron rods positioned to hold the concrete in the tire. As they corrode, the iron rods promote plant/plankton growth providing food for aquatic life.

BACKGROUND OF THE INVENTION

My U.S. Pat. No. 5,807,023, granted Sep. 15, 1998, and entitled Artificial Reef With Corrodible Iron Inserts, discloses the use of tires to form an artificial reef for providing a safe haven for small aquatic life. The tires are equipped with corrodible iron inserts. In use, the inserts corrode to promote rapid phytoplankton growth. The phytoplankton provides food for zooplankton, or tiny animal plankton. Zooplankton are food for small fish, or fry, which in turn are food for larger fish and marine life. My U.S. Pat. No. 6,579,039, granted Jun. 17, 2003, and entitled Submergible Tire Structure, shows using a concrete weight in the lower portion of a tire. The weight is sized and placed so that it holds the tire in a substantially upright position. The tire is provided with corrodible iron inserts in the form of nails or nail-like structures that are placed into the tire by use of a power tool.

There is a need for facilitating the addition of a weight and corrodible iron to a submersible tire structure. The principal object of the present invention is to fill that need.

BRIEF SUMMARY OF THE INVENTION

The submersible tire structure of the invention comprises a vehicle tire having opposite side openings, and opposite sidewalls radially outwardly of and surrounding the side openings. The sidewalls include rims that border the side openings. A tread wall is radially outwardly of and surrounds the sidewalls. The sidewalls and tread wall define an annular chamber in the tire. The tire is positioned to extend substantially upright and presents a bottom tread portion for resting on a support surface, such as the bottom of a body of water. The sidewalls are spread apart above the bottom tread portion. A body of concrete is poured insitu in the tire, above the bottom tread portion and between the spread apart sidewalls of the tire. At least one iron member is embedded in the concrete and positioned to extend from the concrete into the annular chamber in the tire and towards a portion of the tread wall above the concrete member.

In preferred form, the tire comprises a plurality of iron members, each having a lower end portion that is embedded into the concrete and an opposite upper end portion that extends upwardly and outwardly towards a tire tread portion. The lower end portions of the iron members are embedded in the concrete at spaced apart locations and the iron members have upper end portions which extend upwardly and outwardly from the concrete, in opposite directions, substantially to the tread wall.

In one embodiment, pins are inserted through the lower sidewall portions of the tire into the concrete for connecting the concrete to the tire.

A method aspect of the invention comprises obtaining a vehicle tire and positioning it in a substantially upright position with a bottom tread portion directed downwardly. Lower sidewall portions of the tire are spread apart and held apart. Then, concrete is poured into the spread lower portion of the tire. An iron member is placed in the tire and a lower portion of the iron member is embedded into the concrete. The iron member is positioned so that an upper portion of the iron member will extend upwardly and outwardly from the concrete towards the tread wall above the concrete. The concrete is allowed to harden in the spread apart portion of the tire. Then, the tire is submersed into a body of water to serve as a safe haven for aquatic life.

In a preferred method, first and second iron members are placed in the tire. The lower portion of the first iron member is placed into the concrete and the upper portion of the first iron member is directed to extend into the annular chamber towards the tread wall of the tire. The lower portion of the second iron member is placed in the concrete and its upper portion is directed to extend from the concrete in an opposite direction towards a second portion of the tread wall tire that is spaced from the first tread portion.

According to another method aspect of the invention, a pair of form walls are provided. Lower portions of the form walls are positioned into the lower portion of the tire adjacent lower sidewall portions of the tire. Upper portions of the form walls are positioned to project upwardly above lower rim portions of the tire. Concrete is poured into the spread apart lower portion of the tire and into the space defined by and between the form walls.

The invention also includes providing a tire spreading tool characterized by an elongated screw and spaced apart spreader bars. One end of the screw is mounted for rotation on one of the spreader bars. The second spreader bar is mounted for travel back and forth lengthwise of the screw in response to its rotation. Rotation of the screw in a first direction moves the second spreader bar away from the first spreader bar. Rotation of the screw in the opposite direction moves the second spreader bar towards the first spreader bar. The spreader bars are moved relatively together to enable placement of them inside of a tire with the first spreader bar against a first lower sidewall portion of the tire and the second spreader bar against a lower second sidewall portion of the tire. A hand engagable power tool may be positioned above the screw generally between the two spreader bars. The output of the power tool may be connected to the driven end of the screw by a gear box. The power tool may include a handle on its top by which it can be handled for moving the spreader tool into and out from the tire.

These and other advantages, objects and features will become apparent from the following best mode description, and from the accompanying drawings, and the claims.

BRIEF DESCRIPTION OF THE DRAWING FIGURES

Like reference numerals are used to designate like parts throughout the several views of the drawing, and:

FIG. 1 is a pictorial view showing a single tire submerged in a body of water and held in a substantially upright position by a weight in the form of a concrete insert in a lower portion of the tire, such view showing the concrete extending upwardly above the lower rim portions of the tire and showing iron inserts extending upwardly and outwardly in opposite directions from the concrete towards the inner side of the tread wall of the tire;

FIG. 7 is a pictorial view of a portable tool for spreading the sidewall portions of the tire apart;

FIG. 8 is a sectional view taken substantially along line 8—8 of FIG. 7;

FIG. 9 is a pictorial view of one of the spacer blocks used to hold the lower sidewall portions of the tire apart after they have been spread by the spreader tool;

FIG. 10 is a sectional view through the tire shown the spreader tool positioned in the tire before the tire is spread;

FIG. 11 is a view like FIG. 10 but showing the spreader tool operated to spread apart the lower sidewall portions of the tire;

FIG. 12 is a view like FIG. 7 but showing a modified construction of the tire spreading tool;

FIG. 13 is an exploded pictorial view of the assembly shown by FIG. 12; and

DETAILED DESCRIPTION OF THE ILLUSTRATED EMBODIMENT

Figure 1:
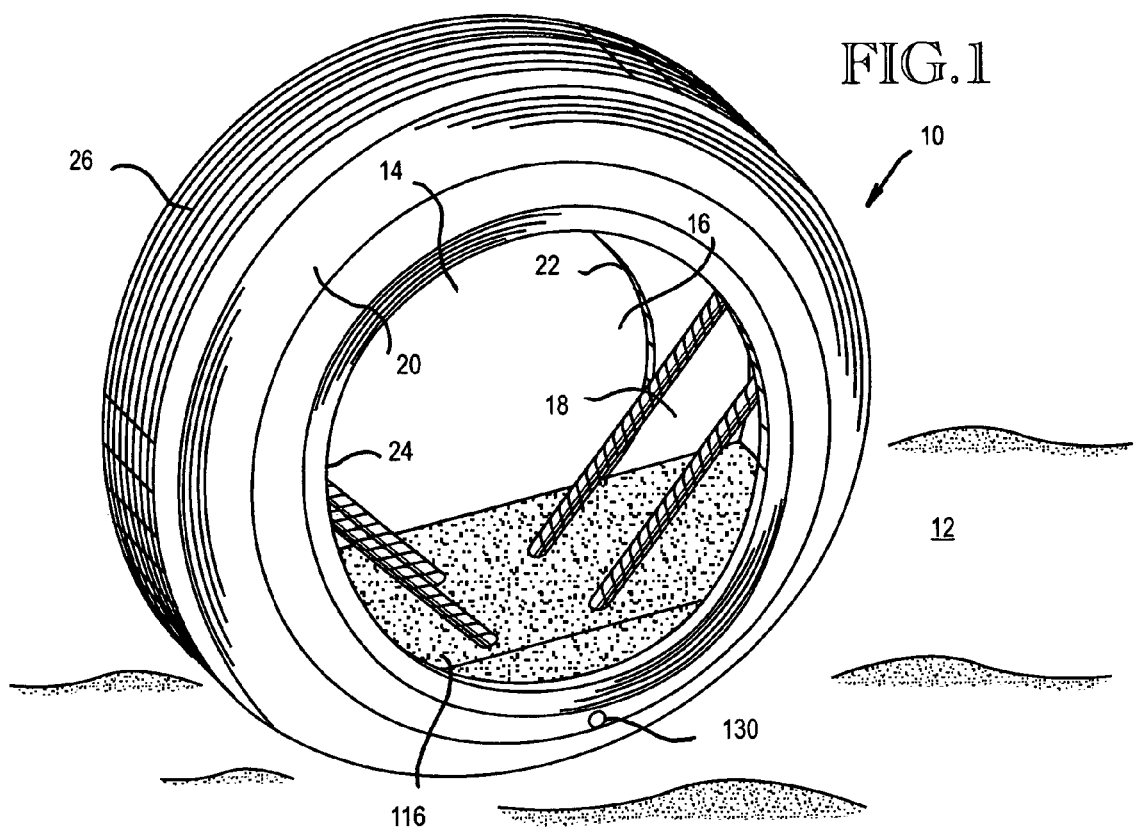

FIGS. 1–6 show a vehicle tire 10 that has been set in a generally upright position with a lower tread portion 12 of the tire sit on a supporting surface, shown in the form of the bottom 12 of a body of water. The tire has opposite side openings 14, 16 that are surrounded by sidewalls 18, 20 having rims 22, 24 that border the side openings 14, 16.

Referring to FIGS. 2–6, the tire 10 is positioned to where it extends substantially upright and presents a bottom tread wall portion 26 that sets down on a support surface 12 such as the bottom of a body of water. As shown by FIGS. 2–6, before the tire is placed in the water, its lower sidewall portions are spread apart and held apart in any suitable manner. FIG. 11 shows the sidewalls 18, 20 spread apart by use of a portable spreader tool 28 that has been especially designed for that purpose. This tool can be taken to the tire. Of course, other spreader type tools may be used, including tools used in tire shops.

Referring to FIGS. 2, 3, 7, 8, 10 and 11. The tool 28 is shown to comprise an elongated threaded rod or screw 30 and a pair of tire engaging members 32, 34 that may be fashioned from lengths of angle iron, cut and bent into the figuration that is illustrated. As best shown by FIG. 8, the horizontal leg 36 of spreader bar 32 is attached to an elongated bar 38 that extends below the screw 30. In similar fashion, the horizontal leg 40 of the spreader bar 34 is connected to one end of an elongated bar 42 that is positioned below a short length of tubing 44 through which the screw 30 extends. Tubing 44 is connected to bar 42. A pair of lead nuts 46, 48 are welded or otherwise firmly secured to the opposite end portions of the longitudinal bar 38. A second pair of nuts 50, 52 are pin-connected to the screw 30. Nut 50 is adjacent the inner end of tube 44 and nut 52 is adjacent the outer end tube 44. A pair of stop nuts 54, 56 are positioned on the screw 30 endwise outwardly of the lead nut 46. As can be easily visualized by looking at FIG. 8, rotation of the screw 30 in one direction will cause the nuts 46, 48 to travel endwise outwardly on the screw 30. Rotation of the screw 30 in the opposite direction will cause the nuts 46, 48 to travel along the lead screw 30 towards the nut 50. Movement of the lead nuts 46, 48 on the screw 30 causes a movement of the spreader bar 32 relative to the spreader bar 34. In one direction of the rotation of screw 30, the spreader bar 32 moved towards the spreader bar 34. In the opposite direction of rotation of screw 30, the spreader bar 32 moves away from spreader bar 34.

FIG. 10 shows the spreader tool 28 positioned with the spreader bars 32, 34 inside the tire in contact with lower rim portions of the tire. Rotation of the screw 30 in the direction causing movement of the lead nuts 46, 48 away from the nut 50, moves the spreader bars 32, 34 relatively apart. This spreads apart the lower sidewall portions 18, 20 of the tire 10. Spreader bar 32 can be moved away from spreader bar 34 until lead nut 46 contacts the stop nut 56. Stop nuts 54, 56 are both rotatable on the screw 30. Accordingly, the nuts 54, 56 can be adjusted in position on the screw 30 for the purpose of changing the stop position of the spreader bar 32. A grease fitting (not shown) can be provided on the tube 44 so that grease can be pumped into the tube 44 between it and the screw 30.

Figure 2:
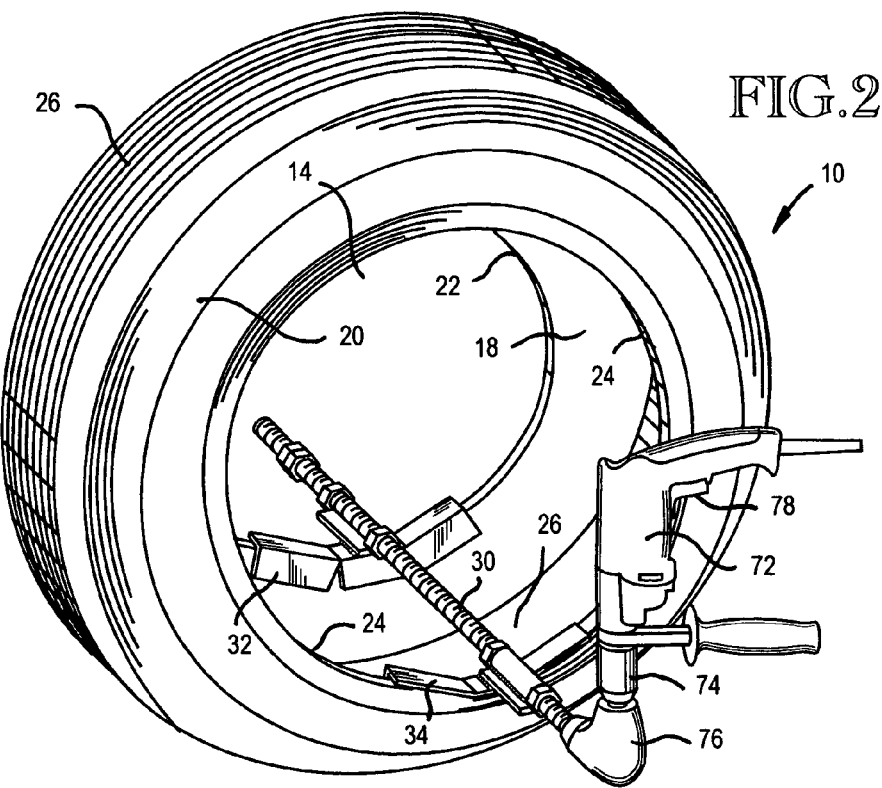
FIG. 2 is another view of a tire in an upright position, showing a spreader tool installed in the tire for exerting a spreading force on the lower sidewall portions of the tire.

The screw 30 has an end piece 70 that is sized to be gripped by the jaws of a rotary drive unit. Two embodiments of the drive unit are disclosed. The first one is designated 72 in FIG. 2. It is built like an electric power drill and its chuck 74 is adapted to connect directly to the end piece 70 on screw 30 or to the input of a right angle drive 76. FIG. 2 shows the chuck 74 connected to the inlet of right angle drive 76 and the outlet of the right angle drive connected to the end member 70 on the screw 30. The power tool 72 has a trigger 78 that is depressed to turn it on and in part a rotary driving motion to the screw 30, either directly or indirectly.

Figure 14:
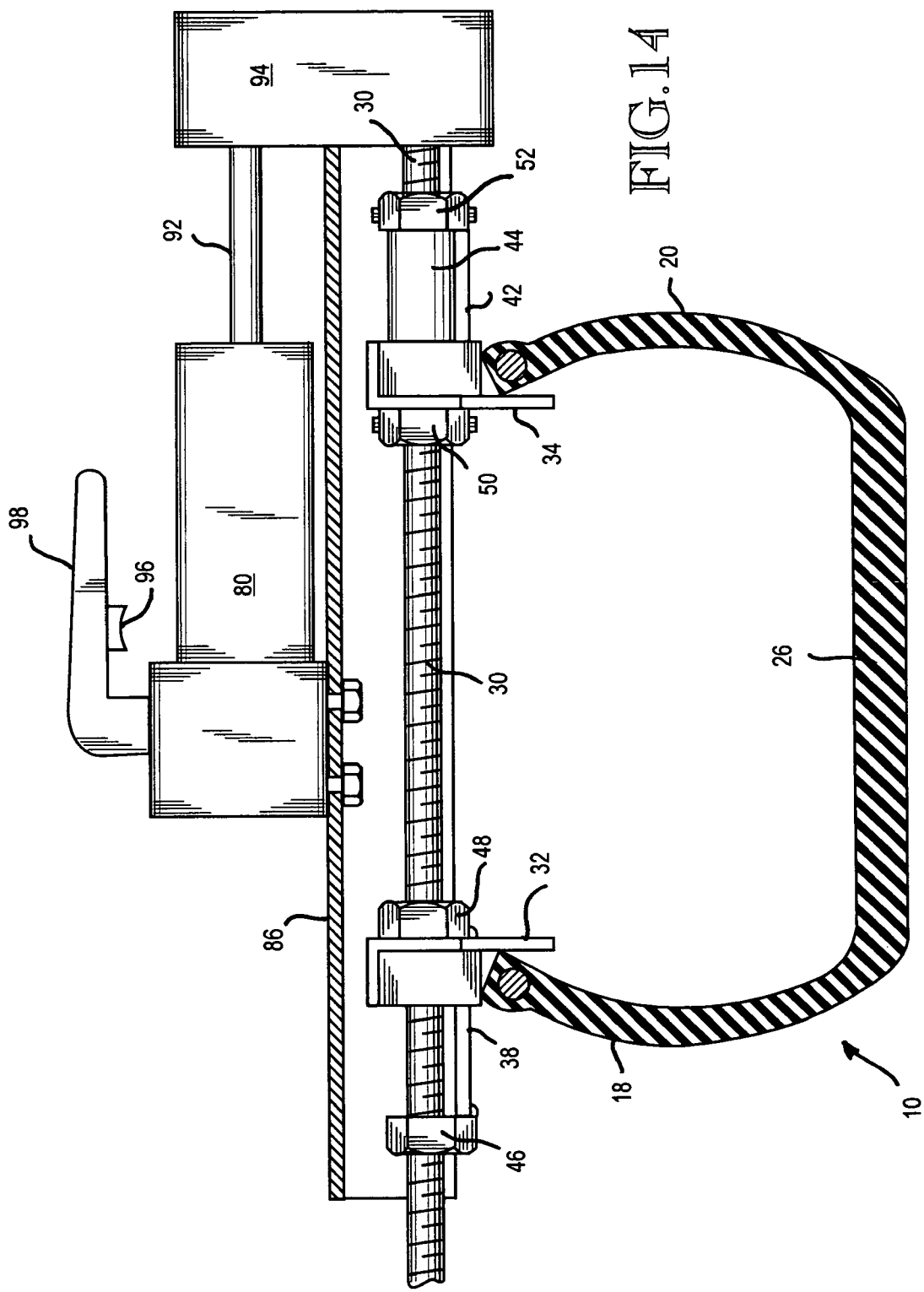
FIG. 14 is a sectional view taken substantially along line 14—14 of FIG. 12.

FIGS. 12–14 show a second embodiment of the power tool 80. It has a housing 82 that is attached to the web 84 of an inverted channel member 86. End portion 88 of the channel member 86 is connected to the longitudinal member 42. The opposite end of the channel member 86 is not attached to anything. Accordingly, member 88 moves with spreader bar 34 and moves relative to spreader bar 32. Stated in another way, spreader bar 32 moves back and forth lengthwise of member 86 as it moves towards and away from spreader bar 34. The housing 90 of the power tool 82 is secured to the central portion 84 of member 86. Power tool 82 has an output shaft 92 which is coupled to gearing within a gear box 94. Gear box 94 has an output which is connected to end member 70 of screw 30. The power tool 82 has a handle 94 that includes a control trigger 96. The user grabs the handle 92 and uses it for moving the tool 82, and the assembly 32, 34, 86 into and out from the tire 10. The user may position the spreader bars 32, 34 in the position shown by FIG. 10. Then, the user can operate the trigger 96 for starting the power tool so that it will drive the drive screw 30.

Figure 3:
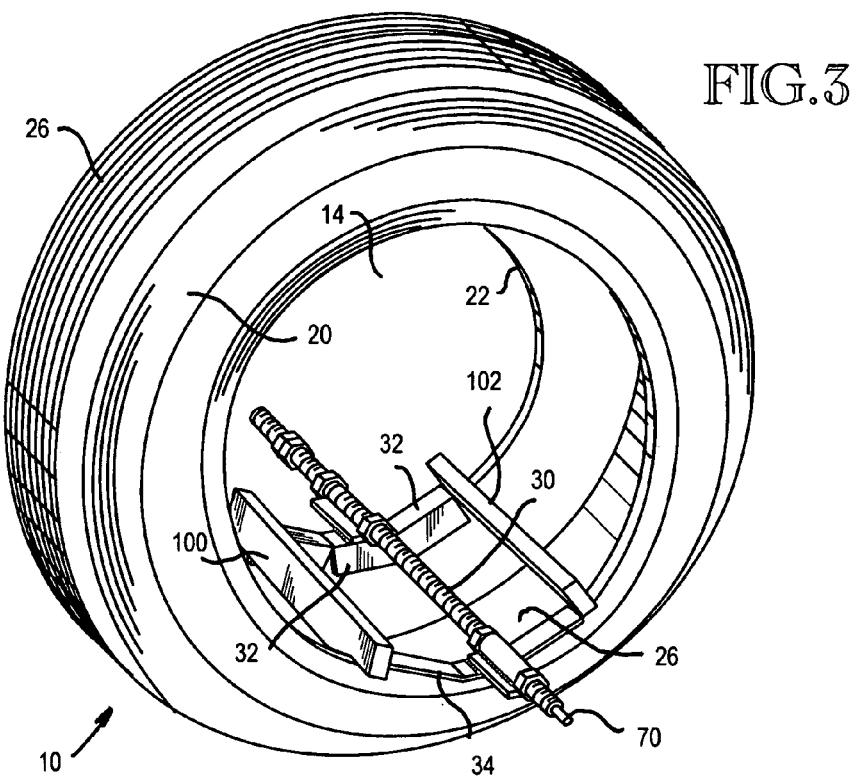
FIG. 3 shows the spreader tool operated to spread the lower sidewall portions of the tire apart, and further shows spacer blocks positioned in the tire between the spread part lower sidewall portions of the tire.
Figure 4:
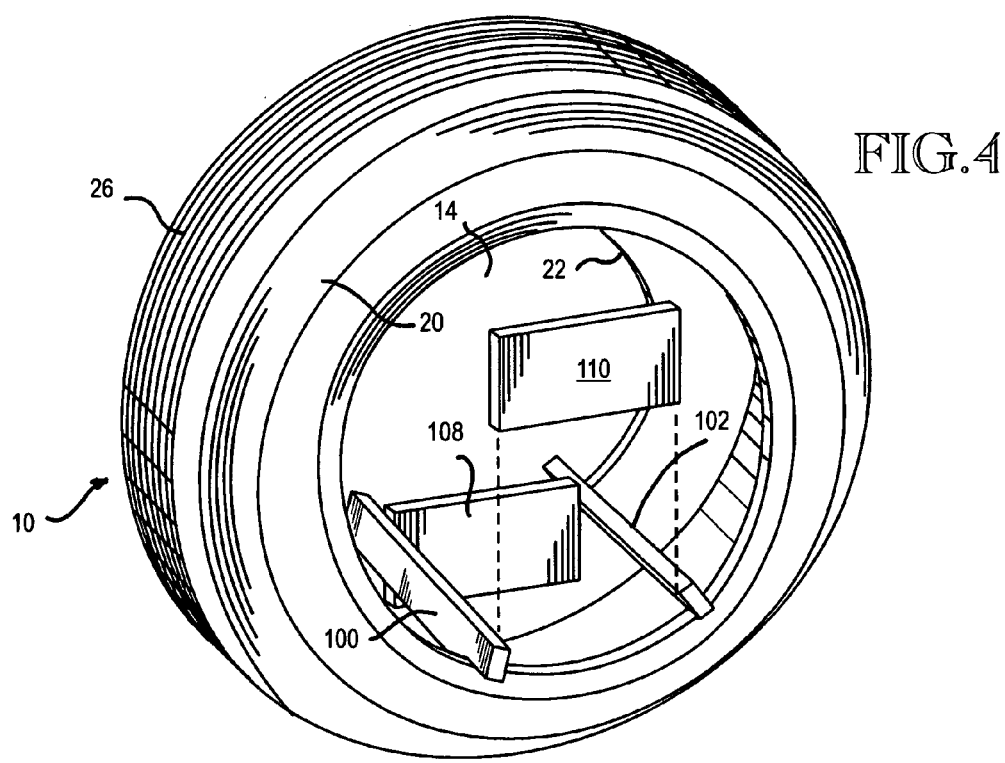
FIG. 4 is a view like FIG. 3 but with the spreader tool removed and showing one form wall installed and a second form wall spaced above its installed position.
Figure 5:
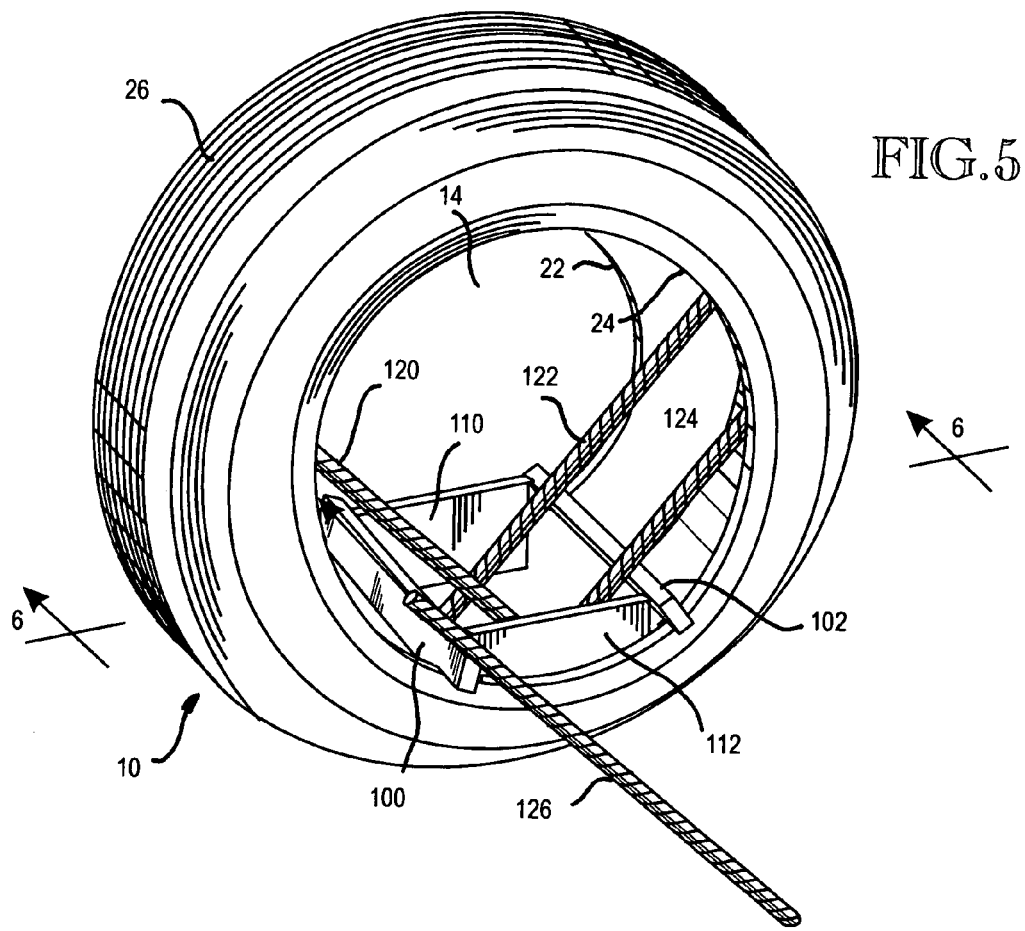
FIG. 5 is a view like FIGS. 2–5 showing three iron rods set in place and a fourth iron rod outside of the tire prior to installation.
Figure 6:
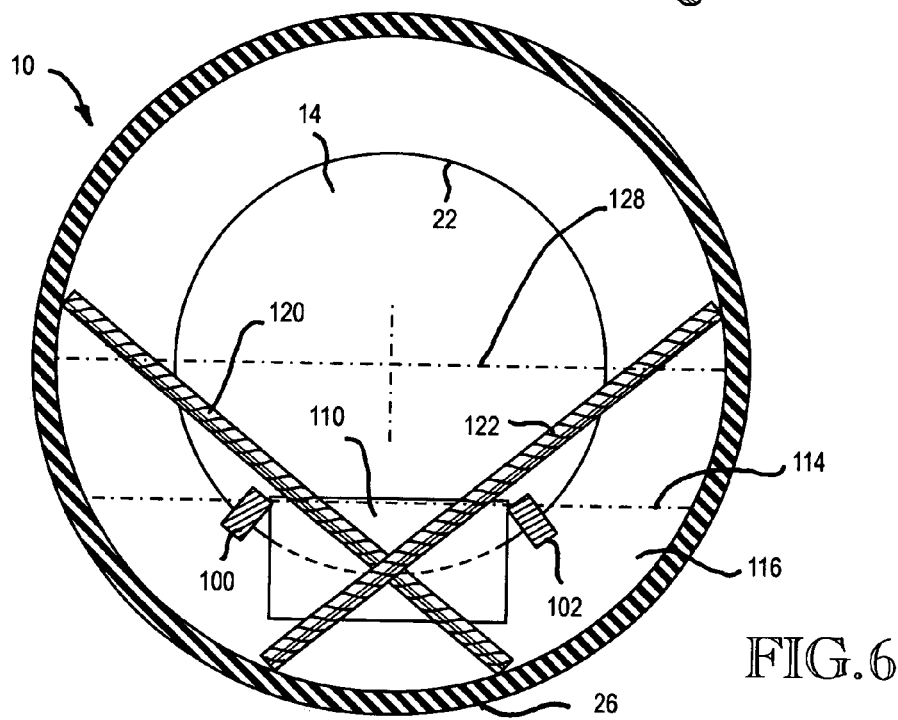
FIG. 6 is a vertical sectional view taken substantially along line 6—6 of FIG. 5, showing all four of the iron rods positioned in the tire.

Referring to FIGS. 3 and 6, after the form sidewall portions of the tire 10 are spread apart, a pair of spreader bars 100, 102 are inserted in the tire between the spread apart sidewalls. Spreader bar 100 is shown by FIG. 9. Spreader bar 102 is of identical construction so it is not separately illustrated. The spreader bar 100 is notched at 104, 106. The spreader bars 100, 102 are positioned in the tire endwise of the two spreader bars 32, 34, as shown in FIG. 3. They are set down with rim portions of the tire within the notches 104, 106 and side portions of the spreader bars 100, 102 resting against the ends of the spreader bars 32, 34. The spreader bars 100, 102 are left in place after the spreader assembly 30, 32, 34 has been removed. Then, a pair of form walls 108, 110 may be positioned in the manner shown by FIG. 4. The ends of the members 108, 110 substantially contact the spreader bars 100, 102 and the outer sides of the members 108 contact the rim portion of the tire between the spreader bars 100, 102. FIG. 5 shows both of the form walls 110, 112 in place. It is to be understood that the use of the form walls 110, 112 is an optional feature. If they are not used, the concrete will only come up to the upper edges of the tire rim portions that extend between the members 100, 102. The use of the form walls 108, 110 makes it possible to pour a larger concrete insert in the tire than would otherwise be the case. FIG. 6 shows the upper surface 114 of the concrete body 116 when the form walls 108, 110 are used.

The illustrated embodiment shows positioning four iron bars 120, 122, 124, 126 in the tire. FIG. 6 best shows the length of the bars 120, 122, 124, 126 relative to the inside of the tire 10. Lower portions of the iron bars 120, 122, 124, 126 are positioned where they will become embedded in the concrete 116. The bars 120, 122, 124, 126 slope upwardly and outwardly as they extend from the concrete 116 into the inside of the tire 10 above the concrete 116. The diametric center of the tire is shown by the line 128. The upper ends of the iron bars 120, 122, 124, 126 are shown to be against the inside surface of the tread wall 26 above the center of the tire. When the concrete 116 hardens, the iron bars 120, 122, 124, 126 are held in place. There outer ends are prevented from moving by contact between them and the inner surface of the tread wall 26. When the concrete is hardened, the spreader bars 100, 102 and the form walls 110, 112 are removed. As will be appreciated, the interference between the upper ends of the iron bars 120, 122, 124, 126 and the tire prevents the concrete member 116 from moving out of the tire. Also, the iron bars 120, 122, 124, 126 provide a substantial amount of exposed iron inside the tire above the concrete 116 so that it is not necessary to shoot the tire with nails such as shown by my U.S. Pat. Nos. 5,807,023 and 6,579,039. It is easier and faster to cast the concrete insert 116 in place than it is to precast it and then place it in the tire, as is disclosed in my U.S. Pat. No. 6,579,039. Also, by being cast in place, and held in place by the iron bars, 120, 122, 124, 126, the concrete insert 116 will for sure be retained in the tire 10. Although it is not necessary to apply a large number of nails to the tire 10, it may be desirable to use a nail gun to set a single nail in each side of the tire, connecting the lower sidewall portions of the tire to the concrete insert 116. One such nail 130 is shown in FIG. 1. A second nail may be used in the opposite side at approximately the same location.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments that are illustrated and described herein, but rather are to be determined by the following claims, interpreted according to accepted doctrines of patent claim interpretation, including use of the doctrine of equivalents.

What is claimed is:

1. A submergible tire structure, comprising:
   a vehicle tire having opposite side openings, opposite sidewalls radially outwardly of and surrounding the side openings, said sidewalls including rims that border the side openings, and a tread wall radially outwardly of and surrounding the sidewalls, said sidewalls and tread wall defining an annular chamber in said tire;
   said tire adapted to extend substantially upright and present a bottom tread wall portion for resting on a support surface;
   said sidewalls being spread apart above said bottom tread portion;
   a body of concrete poured in place in the tire, above the bottom tread portion and between the spread apart sidewalls of the tire; and
   at least one iron member embedded in the concrete and extending from the concrete into the annular chamber in the tire and towards a tread portion of the tire above the concrete member.

2. The submergible tire of claim 1, comprising a plurality of iron members, each having a lower end portion embedded in the concrete and opposite upper end portions that extends towards a tire tread portion.

3. The submergible tire structure of claim 2, comprising iron members having lower end portions embedded in the concrete and upper end portions extending upwardly and outwardly from the concrete, in opposite directions, substantially to the tire tread.

4. The submergible tire structure of claim 1, comprising pins projecting through the lower sidewall portions of the tire into the concrete for connecting the concrete to the tire.

5. The submergible tire structure of claim 1, wherein said concrete extends upwardly above the lower rim portions of the tires.

6. A method of making a submersible tire structure, comprising:
   obtaining a vehicle tire having opposite side openings, opposite sidewalls radially outwardly of and surrounding the side openings, and sidewall rims that border the side openings, and a tread radially outwardly of and surrounding the sidewalls, said sidewalls and said tread defining an annular chamber in said tire;
   positioning the tire substantially upright with a bottom tread portion of the tire directed downwardly;
   spreading lower sidewall portions of the tire part and holding them apart;
   pouring a concrete in the spread lower portion of the tire;
   embedding a lower portion of an iron member in the concrete;
   extending an upper portion of the iron member upwardly and outwardly from the concrete into the tire and towards the tread above the concrete;
   allowing the concrete to harden in the spread portion of the tire; and
   submersing the tire in a body of water.

7. The method of claim 6, comprising providing a first iron member and a second iron member, and embedding a lower portion of the first iron member in the concrete and extending an upper portion of the first iron member in a first direction into the annular chamber towards the tread of the tire, and embedding a lower portion of the second iron member in the concrete and extending an upper portion of the second iron member upwardly and outwardly from the concrete in the opposite direction in the tire towards the tread of the tire.

8. The method of claim 7, comprising two steel members embedded in the concrete and having upper portions extending upwardly and outwardly from the concrete into the tire and towards the tread above the concrete in the first direction, and two iron members embedded in the concrete and having upper portions extending upwardly and outwardly from the concrete into the tire and towards the tread above the concrete in the opposite direction.

9. The method of claim 6, comprising placing form walls into the lower portion of the tire at each side opening, said form walls extending upwardly and having upper edges that are spaced above the sidewall rims, and pouring the concrete into the spread lower portion of the tire and into a space defined by and between the form walls.

* * * * *